United States Patent [19]

Romano et al.

[11] Patent Number: 5,386,920
[45] Date of Patent: Feb. 7, 1995

[54] VACUUM PACKAGE TUBELESS ENCLOSURE WITH SELF-WELDED FLANGES

[75] Inventors: Timothy S. Romano, Goleta; Robert E. Zahuta, Lompoc; Karl H. Neumann, Santa Barbara; Leonard E. Peck, Jr., Goleta, all of Calif.

[73] Assignee: Santa Barbara Research Center, Goleta, Calif.

[21] Appl. No.: 108,413

[22] Filed: Aug. 18, 1993

[51] Int. Cl.⁶ .............................................. B23K 20/02
[52] U.S. Cl. .................................... 220/2.2; 228/116; 228/208
[58] Field of Search ............... 228/115, 116, 208, 184, 228/221; 437/222; 220/2.2

[56] References Cited

U.S. PATENT DOCUMENTS

| 3,139,678 | 7/1964 | Anthony et al. | 228/116 |
| 3,203,083 | 8/1965 | Obenhaus | 228/115 |
| 3,751,800 | 8/1973 | Daniels et al. | 228/115 X |
| 4,467,953 | 8/1984 | Yamamoto | 228/116 |
| 4,919,291 | 3/1990 | Romano et al. | 220/2.2 |

FOREIGN PATENT DOCUMENTS 969244 9/1964 United Kingdom ................ 228/115

Primary Examiner—Kenneth J. Ramsey
Attorney, Agent, or Firm—W. C. Schubert; W. K. Denson-Low

[57] ABSTRACT

A vacuum package assembly (20) is prepared by self-welding the flanges (32 and 43) of two housings (28 and 36) together under an applied pressure, while the housings (28 and 36) and any enclosed structure or device are contained within an evacuated enclosure. The flanges (32 and 43) are preferably made of copper, with their respective self-welding members (34 and 46) specially prepared to enhance self-welding performance. The preferred treatment for the self-welding members (34 and 46) is to deposit a thin layer of nickel onto the self-welding members (34 and 46), deposit a thin layer of gold over the nickel, and heat the bonding member to elevated temperature to interdiffuse the gold into the self-welding member (34 and 46).

17 Claims, 2 Drawing Sheets

VACUUM PACKAGE TUBELESS ENCLOSURE WITH SELF-WELDED FLANGES

BACKGROUND OF THE INVENTION

This invention relates to the construction of vacuum package assemblies such as those used to contain infrared detectors.

One type of infrared sensor utilizes a focal plane array (FPA) of individual sensor elements. The sensor elements are typically photodiodes or photoconductors that produce an electrical output responsive to incident infrared energy. The sensor elements are arranged into an array of suitable size, which may comprise a few elements in a linear array or more than 1000 by 1000 elements in a two dimensional array.

For the sensor elements to operate most effectively, they must be cooled to a reduced temperature, for example 77K. Cooling of the sensor elements is accomplished by placing the focal plane array into an evacuated enclosure having a infrared-transmissive window. The enclosure, termed a vacuum package, is cooled to the required reduced temperature by cryogenic gas cooling, Joule-Thomson cooling, thermoelectric cooling, or other operable technique. The present invention relates to the construction of the vacuum package assembly and the method of its fabrication.

In the conventional practice, the vacuum package is formed of a two-part housing. A window housing includes the infrared-transmissive window, and a lower vacuum housing contains the focal plane array, a getter, and related structure. A tip-off tube extends from the side of the lower vacuum housing, and communicates with the interior of the housing.

To accomplish the assembly, the various pieces are carefully cleaned and vacuum baked to remove contaminants. The pieces are sub-assembled and again vacuum baked to remove contaminants. The getter is installed in the housing. The window housing is welded to the lower vacuum housing. A vacuum is drawn on the tip-off tube, and, after evacuation of the interior of the housing, the assembly is baked out to remove contaminants. The getter is fired to reduce contaminants. Finally, the tip-off tube is mechanically pinched together and closed off. The interior of the housing is thereby closed and isolated under vacuum. This approach is described in greater detail in U.S. Pat. No. 4,919,291.

The above-discussed approach, while operable, has disadvantages in some situations. There are numerous vacuum bakeouts required. A relatively large number of parts is required, increasing the time and cost of final assembly. At least two hermetic seals must be made during the final assembly operation. Pumpdown is typically slow, as all gases are evacuated through the small-diameter tip-off tube. The stub of the tip-off tube that remains on the lower vacuum housing may pose a physical obstacle to mounting, external connecting, and other operations that are performed on the vacuum package assembly.

Thus, while the existing approach is operable, it could be improved so as to reduce final assembly costs and to increase the reliability of the sensor system. The present invention provides such an improved sensor system, vacuum package assembly, and method of final assembly, and also provides related advantages.

SUMMARY OF THE INVENTION

The present invention provides a vacuum package assembly and method of assembly that results in an improved sensor system. The vacuum package assembly can be assembled to the required interior vacuum with a reduced number of parts and hand labor, a reduced number of vacuum bakeout steps, and a shorter pumpout time, thereby lowering the cost of the final assembly operation. The resulting vacuum package assembly is superior in construction to that prepared by the conventional approach, having fewer parts and fewer hermetic seals formed during final assembly. There is no tip-off tube that may hinder subsequent operations.

In accordance with the invention, a vacuum package assembly comprises an evacuated housing including a first housing section having a first peripheral flange, a second housing section having a second peripheral flange, and a self-weld bond between the first peripheral flange and the second peripheral flange.

The vacuum package assembly is prepared by the steps of providing a first housing, usually the window housing, having a first peripheral flange with a first flange self-welding member and a second housing, usually the lower vacuum housing, having a second peripheral flange with a second flange self-welding member sized for mating engagement with the first flange self-welding member. After assembly of the focal plane array and its related structure within the second housing, the first flange self-welding member is placed into facing engagement with the second flange self-welding member. The first housing and the second housing are placed into a vacuum chamber, and the vacuum chamber is evacuated. A force is applied to the first peripheral flange and the second peripheral flange sufficient to cause the first flange self welding member and the second flange self-welding member to self-weld together.

To achieve the self-welding capability required in this approach, the first flange self-welding member and the second flange self-welding member are desirably treated to improve their self-welding characteristics. In the preferred approach, wherein the first flange and the second flange are made of copper, the self-weldability is improved by applying a thin layer of nickel to the copper, and then a thin layer of gold overlying the nickel. The coated flanges are heated to a temperature sufficient to interdiffuse the gold into the surface layers of the copper flange. This metallurgical structure achieves excellent self-welding characteristics when pressed together by a sufficient force. A self-welding force of more than about 7500 pounds per square inch, at ambient temperature, produces self-welding in this preferred approach. The self-welding force is preferably applied through tooling that contacts the first and second peripheral flanges on their non-facing sides.

The housings and flanges may be of any operable shape and dimension, within the limitation that the first and second flange-welding members must achieve a mating contact. In one embodiment, the second flange of the lower vacuum housing includes a flexible membrane that connects the second flange self-welding member to the remainder of the lower vacuum housing. This flexible membrane distorts to absorb any bonding stresses that might be otherwise transferred into the lower vacuum housing. In some cases, portions of the lower vacuum housing may be made of ceramics or other materials of low ductility which, absent the flexible membrane, might be cracked by the bonding forces. In another embodiment, a separate intermediate cold-welding member may be placed between the first and second peripheral flanges. In yet another embodiment, the second peripheral flange can include a backing ring against which the second self-welding member rests. The backing ring may optionally include a relief or recess therein into which the bonding ring is crimped during the self-welding operation.

The present invention provides an advance in the art of vacuum package structures and methods. An evacuated vacuum package can be prepared and assembled much more readily than in the prior approaches. In the assembly approach discussed above, the self-welding operation is accomplished in a vacuum chamber, and no separate operation is required to evacuate the interior of the vacuum package housing and then seal a tip-off tube. Other features and advantages of the invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
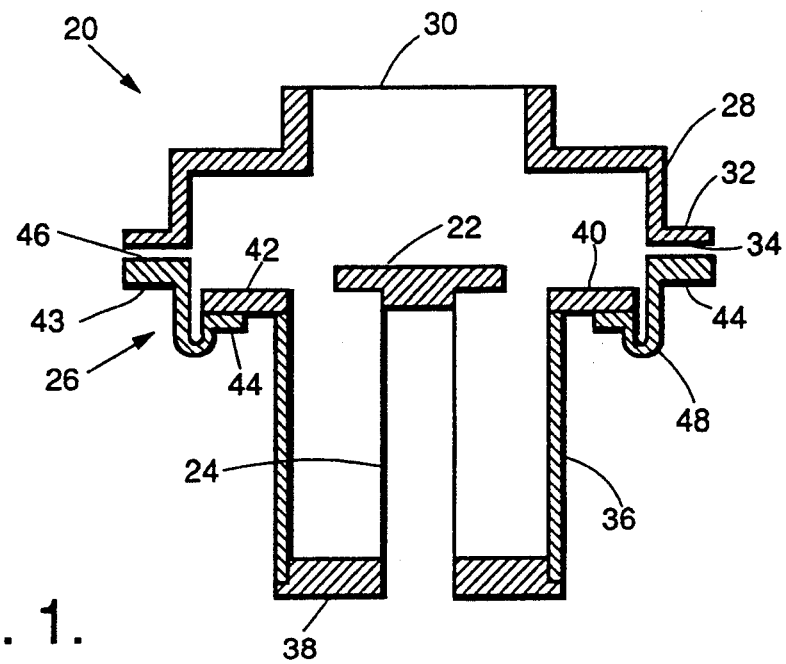
FIG. 1 is a side sectional view of a first embodiment of the vacuum package assembly.

FIG. 1 depicts an infrared-sensor vacuum package assembly 20. The vacuum package assembly 20 includes a focal plane array sensor 22 mounted on a pedestal 24. The pedestal 24 and sensor 22 are fixed within a vacuum package housing 26. The sensor 22 is indicated schematically in this drawing. Such sensors are well known in the art and may include lenses, electronic components, transceivers, and related structure.

The housing 26 includes two parts that are initially separate and then are joined together during assembly. A first housing 28, also termed the window housing, can be cylindrically symmetric, although of varying diameters along its length. The first housing may also be rectangular, square, horseshoe-shaped, elliptical, tetragonal, rhombohedral, or any other operable shape suited for particular applications. An infrared-transparent window 30 covers one end of the first housing 28. A first peripheral flange 32, in this case integral with the body of the first housing, is formed at the other end of the first housing 28. The first peripheral flange 32 has a first flange self-welding member 34, whose structure will be described in greater detail subsequently.

A second housing 36, also termed the lower vacuum housing, is conformably shaped so as to mate with the first housing 36. In the preferred embodiment, the second housing 36 is cylindrically symmetric and of varying diameters along its length. A bottom end 38 of the second housing 36 is closed, with the pedestal 24 mounted to the end 38 such that the sensor 22 is facing the window 30, when the first housing 28 is assembled to the second housing 36. In the particular design of the second housing 36 shown in FIG. 1, the second housing 38 includes an annular ceramic header plate 40 adjacent an upper end 42 of the second housing 36 remote from the lower end 38.

A second peripheral flange 43 is joined to the upper end 42 of the second housing 36. The flange 43 includes a second flange self-welding member 46 thereon. The structure of the second flange self-welding member 46 will be described subsequently. The second peripheral flange 43 and its second flange self-welding member 46 are shaped and sized to mate in a facing fashion with the first peripheral flange 32 and its first flange self-welding member 34. The second flange self-welding member 46 is joined to one end of a flexible membrane 48, whose other end is joined to the header plate 40 by a bonding ring 44. The flexible membrane 48 can deform and flex during assembly when loads are placed onto the members 34 and 45 to effect self-welding. This flexure of the flexible membrane 48 prevents excessive stresses from being transferred into the header plate 40, which is preferably made of a ceramic, to prevent it from cracking.

Figure 2:
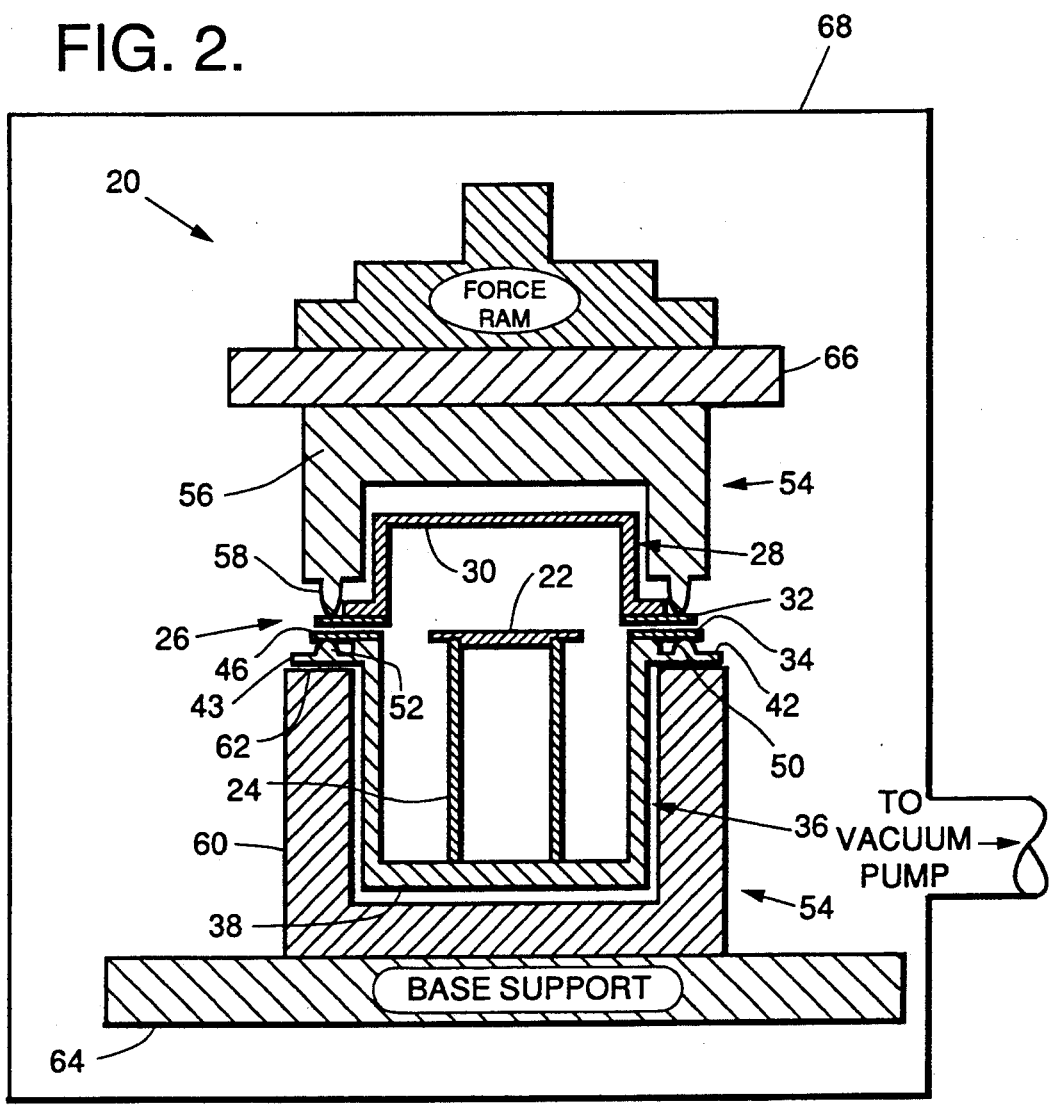
FIG. 2 is a side sectional view of a second embodiment of the vacuum package assembly and the tooling used to accomplish self-welding.

FIG. 2 depicts a second embodiment of the vacuum package assembly 20, having the same general structure as that shown in FIG. 1 but with some variations. Those elements which are comparable in FIG. 2 have been assigned the same designations as in FIG. 1, and will not be described again here.

In FIG. 2, the first housing 28 is the same as in FIG. 2, except that the first peripheral flange 32, with its second flange self-welding member 46, is prepared as a separate structure from the body of the first housing 28, and thereafter joined to the first housing 28. Joining is preferably by brazing using standard brazing practices, but any other operable joining technique may be used.

The second housing 36 is similar to that shown in FIG. 1, except that it utilizes no ceramic header plate. The same second peripheral flange 43 as shown In FIG. 1 may be used. Alternatively, and as depicted In FIG. 2, because transfer of self-welding stresses into a ceramic header plate is not a concern, the flange 43 may be formed as a backing ring 50 that forms the upper end 42 of the second housing, and the self-welding member 46 that is joined to the backing ring 50, preferably by brazing. The backing ring 50 may include an annular ridge 52 therein contacting a lower side of the self-welding member 46. During the bonding and self-welding operation, ridge 52 cooperates with the external tooling to ensure a highly concentrated bonding force, as will be described subsequently.

FIG. 2 also shows the tooling 54 that is used in this self-welding operation. Similar tooling is used in the self-welding operation for the embodiment of FIG. 1, but is not shown in FIG. 1. The tooling 54 includes an upper tool 56 that is generally hollow and of the required shape to conformably fit over the first housing 28, which is cylindrical in the preferred case. The cylindrical diameter of the upper tool 56 is selected to fit over the body of the first housing 28 and against the first peripheral flange 32. More specifically, a force-concentrating annular ridge 58 of the upper tool 56 contacts the upper side of the first peripheral flange 32. The annular ridge 58 of the tooling is positioned in opposition to the annular ridge 52 of the second flange self-welding member 46. These ridges concentrate the force applied externally to effect the bonding into a small annular area of the facing and contacting surfaces of the members 34 and 46. The concentrated pressure ensures a close contact of these members 34 and 46 along a corresponding annular sealing surface around the entire periphery of the members 34 and 46. The close, high-pressure contact results in a hermetic weld between the members 34 and 46. A lower tool 60 is also of hollow cylindrical (in the preferred case) shape sized to receive the body of the second housing 36 therein. An upper end 62 of the lower tool 50 fits against the underside of the second peripheral flange 43.

During the assembly operation, the first housing 28, second housing 35, and tooling 54 are assembled in the manner illustrated in FIG. 2. This assembly is placed between a base support 64 and a platen 66 of a press (not shown) of sufficient capacity provide the self-welding forces required. These elements are within a vacuum chamber 68.

Figure 3:
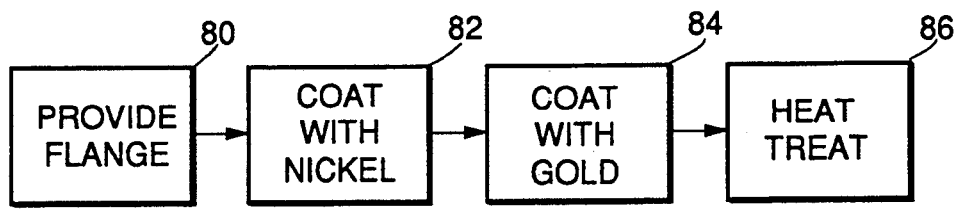
FIG. 3 is a block flow diagram for the preparation of the self-welding members of the flanges.

FIG. 3 illustrates the procedure for preparing the first flange self-welding member 34 and the second flange self-welding member 46, so that they can be readily self-welded together. The flange is first provided, numeral 80. The flange may be integral with its housing, as In FIG. 1, or a separate element, as in FIG. 2. In each case, the portion to be self-welded is treated in the following manner. The treatment procedure is the same as that described in U.S. Pat. No. 4,919,291, whose disclosure is incorporated by reference. Here, as there, the preferred material of construction of the flange is oxygen free high conductivity (OFHC) or oxygen free, electronic grade (OFE) copper. Other materials such as standard copper, nickel, or other self-welding materials can be used, as desired, if they possess similar self-welding properties to copper treated as described. If other materials of construction are used, they may be used directly, or a layer of OFHC or OFE copper may be applied to the flange before the following steps.

A layer of nickel, termed a flash or strike layer, is coated onto the self-welding member, numeral 82. Any operable technique may be used, but the preferred approach is by electroplating. In electrolytic deposition, the nickel is deposited from a nickel sulfamate (Watts) bath or any other operable type, using standard deposition parameters. The nickel layer is preferably as thin as possible while covering the surface completely. A thin layer of 99.9 percent pure gold, preferably in a thickness of up to about 0.0003 inches, is deposited over the nickel layer, numeral 84. The gold layer is preferably plated electrolytically. Other plating materials may be used instead of gold as long as the plating material has a nobility which resists oxidation, is malleable, and is capable of being diffused into the substrate to provide for improving the self-welding characteristics of the substrate.

The plated flange is placed into a vacuum furnace, preferably at a pressure of about $10^{-4}$ Torr or less, and heat treated, numeral 86. The preferred heat treatment is at a temperature of from about 1700° F. to about 1750° F. for a time of less than about 10 minutes. During the heat treatment, the gold plating diffuses into the surface of the substrate flange to a depth of about 0.008 to about 0.002 inches. The diffused flange is cooled and removed from the vacuum furnace, and is ready for further steps of the assembly procedure.

Figure 4:
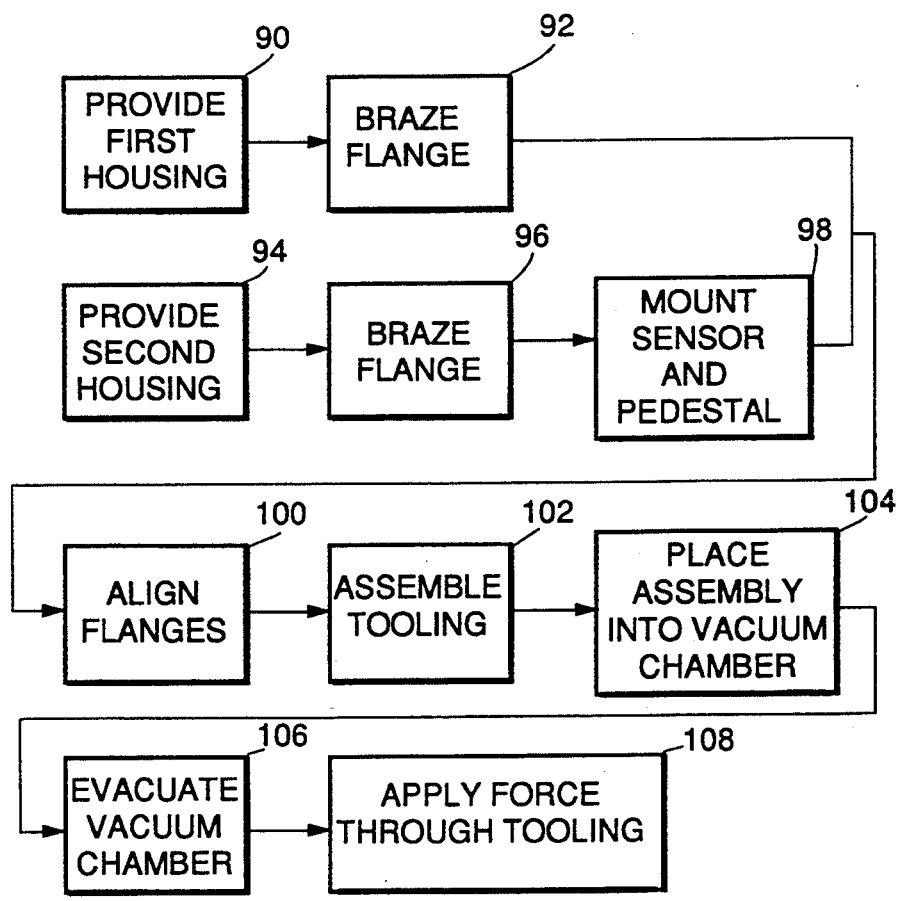
FIG. 4 is a block flow diagram for the assembly of the vacuum package.

FIG. 4 depicts the process for assembling the vacuum package assembly 20, after the process of FIG. 3 has been performed on both of the peripheral flanges to create the self-welding members 34 and 46. The first housing 28 is provided in the required configuration including the window 30, numeral 90. If the first peripheral flange 32 is provided as a separate component, it is attached to the body of the first housing 28, preferably by brazing, numeral 92. If the first peripheral flange 32 is integral with the body of the first housing, the step 92 is omitted. The second housing 36 is provided in the required shape and size, numeral 94. The second peripheral flange 43 is fastened thereto, numeral 96, if the second peripheral flange 43 is provided as a separate unit. Otherwise, step 96 is omitted. The pedestal 24 and its sensor 22 are mounted in the second housing 36, numeral 98. The two sub-assemblies are complete, and ready for joining.

The first flange self-welding member 34 is placed into facing engagement with the second flange self-welding member 46, numeral 100. The tooling 54 is assembled in place, numeral 102. The assembly appears as shown in FIG. 2, provided, however, that the vacuum package assembly itself may be that shown in FIG. 1 or may be some variation of the structures depicted. The assembly is either made within the vacuum chamber or, if made elsewhere, is moved into the vacuum chamber, numeral 104. The vacuum chamber is then evacuated to a pressure of less than about $10^{-4}$ Torr, numeral 106.

Self-welding of the self-welding members 34 and 46 is accomplished, numeral 108, by applying a force to the upper tool 56, which acts through the contacted flanges 32 and 43, and the lower tool 60 and thence against the support 64. Self welding of the members 34 and 45 is accomplished with a pressure of at least about 7500 psi over the members 34 and 46. This self-welding is preferably accomplished quickly at ambient temperature, although the temperature may be raised to reduce the pressure and/or time required to complete the self welding. The pressure in the vacuum chamber is returned to atmospheric, and the completed vacuum package assembly 20 is removed.

With this approach, the vacuum pumping of the system occurs rapidly, because evacuation is through a large gate valve rather than a small tip-off tube. There is only one self-welded joint, and there is little hand labor involved in the bonding operation. The vacuum package assembly is therefore reliable and economic to produce. The technique can be used to prepare vacuum package assemblies of various shapes and sizes. The final vacuum package is permanently sealed with a vacuum therein.

Although a particular embodiment of the invention has been described in detail for purposes of illustration, various modifications may be made without departing from the spirit and scope of the invention. Accordingly, the Invention is not to be limited except as by the appended claims.

What is claimed is:

1. A method for preparing a vacuum package assembly, comprising the step of:
   providing a first housing having a first peripheral flange with a first flange self-welding member;
   providing a second housing having
      a second peripheral flange with a second flange self-welding member sized for mating engagement with the first flange self-welding member, and
      a backing ring against which the second flange self-welding member rests, the backing ring having an annular ridge thereon to concentrate force during bonding;

placing the first housing and the second housing into a vacuum chamber and evacuating the vacuum chamber;

placing the first flange self-welding member into facing engagement with the second flange self-welding member; and applying a force to the first peripheral flange and the second peripheral flange sufficient to cause the first flange self welding member and the second flange self-welding member to self-weld together.

2. The method of claim 1, wherein the step of providing a first housing includes the steps of providing a first housing structure having no flange thereon, and bonding the first peripheral flange to the first housing structure.

3. The method of claim 1, wherein the step of providing a second housing includes the steps of providing a second housing structure having no flange thereon, and bonding the second peripheral flange to the second housing structure.

4. The method of claim 1, wherein the first flange self-welding member is prepared by the steps of providing a first flange structure and having the first flange self-welding member thereon, treating the first flange self-welding member to enhance its self-weldability.

5. The method of claim 1, wherein the first flange self-welding member is prepared by the steps of providing a first flange structure made of copper and having the first flange self-welding member thereon, depositing a layer of nickel onto the first flange self-welding member, depositing a layer of gold onto the first flange self-welding member, and heating the first flange self-welding member to a temperature sufficiently high to partially diffuse the gold into the first flange structure.

6. The method of claim 1, wherein the second flange self-welding member is prepared by the steps of providing a second flange structure and having the second flange self-welding member thereon, treating the second flange self-welding member to enhance its self-weldability.

7. The method of claim 1, wherein the second flange self-welding member is prepared by the steps of providing a first flange structure made of copper and having the second flange self-welding member thereon, depositing a layer of nickel onto the second flange self-welding member, depositing a layer of gold onto the second flange self-welding member, and heating the second flange self-welding member to a temperature sufficiently high to partially diffuse the gold into the second flange structure.

8. The method of claim 1, wherein the step of applying a force includes the steps of placing a first tool on the opposite side of the first peripheral flange from the first flange self-welding member, placing a second tool on the opposite side of the second peripheral flange from the second flange self-welding member, and forcing the first tool toward the second tool.

9. The method of claim 1, wherein the second peripheral flange further comprises a flexible membrane attached to the second flange self-welding member, and a bonding ring attached between the flexible membrane and the remainder of the second housing.

10. A vacuum package assembly comprising an evacuated housing including:

a first housing section having a first peripheral flange;

a second housing section having a second peripheral flange, wherein the second peripheral flange comprises a second flange self-welding member, and a flexible membrane that connects the second flange self-welding member to the remainder of the second housing section; said second housing section further including a backing ring against which the second flange self-welding member rests; and a self-weld bond between the first peripheral flange and the second peripheral flange.

11. The vacuum package assembly of claim 10, wherein the backing ring has an annular ridge thereon to concentrate force during bonding.

12. The vacuum package assembly of claim 10, wherein the first peripheral flange and the second peripheral flange are made at least in part of copper, and wherein the self-weld bond comprises a gold/copper layer in the first peripheral flange bonded to a gold/copper layer in the second peripheral flange.

13. The vacuum package assembly of claim 10, further including an infrared detector mounted within the evacuated housing.

14. A vacuum package assembly prepared by the steps of:

providing a first housing having a first peripheral flange with a first flange self-welding member, the first flange self-welding member being prepared by the steps of providing a first flange structure made of copper and having the first flange self-welding member thereon, depositing a layer of nickel onto the first flange self-welding member, depositing a layer of gold onto the first flange self-welding member, and heating the first flange self-welding member to a temperature sufficiently high to partially diffuse the gold into the first flange structure;

providing a second housing having a second peripheral flange with a second flange self-welding member sized for mating engagement with the first flange self-welding member, the second flange self-welding member being prepared by the steps of providing a second flange structure made of copper and having the second flange self-welding member thereon, depositing a layer of nickel onto the second flange self-welding member, depositing a layer of gold onto the second flange self-welding member, and heating the second flange self-welding member to a temperature sufficiently high to partially diffuse the gold into the second flange structure, the second peripheral flange further comprising a backing ring against which the second flange self-welding member rests, the backing ring having an annular ridge thereon to concentrate force during bonding;

placing the first flange self-welding member into facing engagement with the second flange self-welding member;

placing the first housing and the second housing into a vacuum chamber and evacuating the vacuum chamber; and applying a force to the first peripheral flange and the second peripheral flange sufficient to cause the first flange self welding member and the second flange self-welding member to self-weld together.

15. The vacuum package assembly of claim 14, wherein the step of applying a force includes the steps of placing a first tool on the opposite side of the first peripheral flange from the first flange self-welding member, placing a second tool on the opposite side of the second peripheral flange from the second flange self-welding member, and forcing the first tool towards the second tool.

16. The vacuum package assembly of claim 14, wherein the step of providing a second housing includes the step of providing the second peripheral flange comprising a flexible membrane attached to the second flange self-welding member, and a bonding ring attached between the flexible membrane and the remainder of the second housing.

17. The vacuum package assembly of claim 14, including the additional step, before the step of placing the first flange self-welding member into facing engagement with the second flange self-welding member, of mounting an infrared detector to the interior of the second housing.

* * * * *